United States Patent Office 3,420,409
Patented Jan. 7, 1969

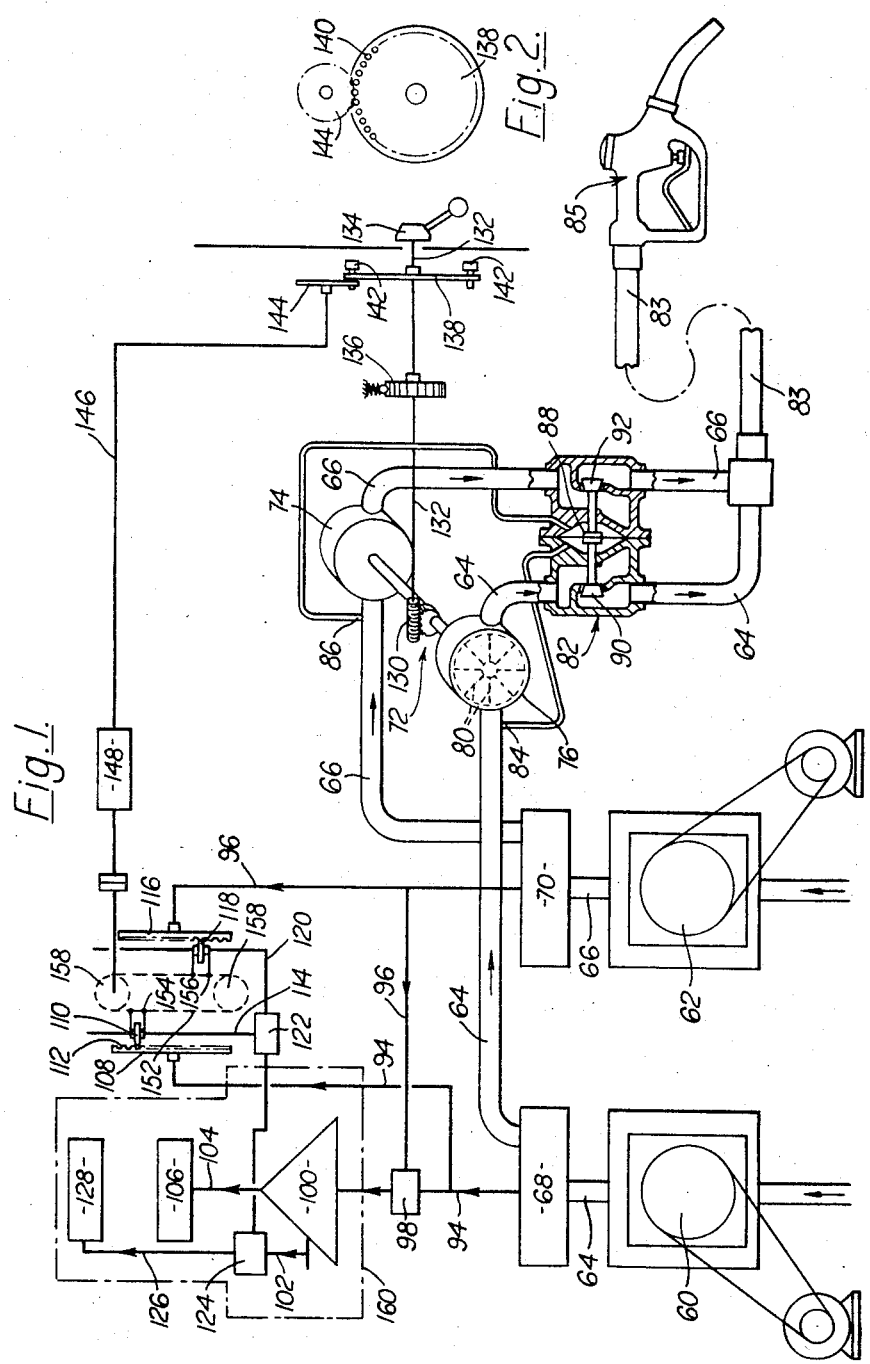

3,420,409
LIQUID DISPENSING APPARATUS
Colin Roderick Petyt, Hillingdon, and Hugh Edmund Phillips, London, England, assignors to Avery-Hardoll Limited, Chessington, Surrey, England, a British company, and Beck & Co. (Meters) Limited, London, England, a British company
Filed Mar. 27, 1967, Ser. No. 626,315
Claims priority, application Great Britain, Nov. 1, 1966, 49,004/66
U.S. Cl. 222—26   7 Claims
Int. Cl. B67d 5/08; 5/56

ABSTRACT OF THE DISCLOSURE

A liquid dispensing apparatus blending different liquids and having a price computing means which multiplies the volume of each of the liquids dispensed as measured by a meter in the flow line of each of the liquids respectively by the price per unit of that liquid and then adding the separate prices to give a final cost. A price incremental value can be added or subtracted to this total cost by means of a control associated with a blend selecting means for adjusting the same to give a different increment value to any one or all selected blends.

---

This invention relates to liquid fuel dispensing apparatus. It is especially concerned with apparatus for dispensing blends of two different liquids, e.g., two petrols of different octane ratings, or petrol and oil. Such apparatus normally includes devices for multiplying the volume of each of the liquids dispensed as measured by a meter in the flow line of each of the liquids respectively, by the price per unit of that liquid and then adding the two monetary totals so calculated to give the final cost.

In the specification of our copending application No. 626,062 there is described apparatus which includes means for adding or subtracting an increment in the drive representative either of one or the other of the individual computed prices of the liquids prior to their being added, or to the drive to the final adding device at the display point or indicator, the increment being the output of a variable gearing, possibly an infinitely variable gear, driven by a drive representing the total volume of the liquids being dispensed.

Thus the increment per unit volume can be pre-determined by adjustment of the variable gearing and the total amount of the increment, either positive or negative, which is included in the final cost is determined by the total volume of the liquids dispensed.

The amount of the increment, as described in our specification No. 626,062, is determined by the setting of the variable gear and this is changed by a drive transmitted from the gearing which determines the proportions of the liquids in the blend so that the variable gear determining the increment is changed automatically when the blend is changed. Further the variable gearing can be changed independently of the blend change.

If the device or devices, e.g., a standard variator used to multiply a drive indicating the volume of a liquid by a unit price, can be adjusted to compensate for an increase or decrease in the unit price of the petrol as is desired, then due to legal requirements the device must be positioned in a sealed compartment so that it is not possible to alter the basic price at which the cost is computed unless at the same time the gearing is altered so that that price is displayed and only adjusted by authorised operators.

If the control for adjustment of the variable gear which adds or substract an increment to the total proportional price, is located outside the sealed compartment then he total cost of any blend dispensed by apparatus in accordance with the invention, may be altered by an adjustment outside the sealed compartment and can be made for example by a garage proprietor who wishes to adjust the price of any particular blend either upwardly or downwardly.

In accordance with a feature of this invention the control for the variable gearing determining the increment includes means for adjusting the variable gear to give a different increment to any one or all of the selected blends. The gear control is preferably linked to the means for selecting the proportion of the constituents of the blend in such a way that the increment is altered as the blend is changed. With such an arrangement the means to adjust the variable gear independently of the blend selection may be incorporated in the connection between the variable gear and the blend selector.

One very convenient device comprises a disc on a shaft which is turned through an angle when the selected blend is to be changed and a second disc secured to a shaft forming part of the drive to the variable gear, the disc on the blend selector shaft driving the second disc by means of pegs which can be inserted in selected holes around the periphery of one disc and be located in the path of the periphery of the other disc which is formed with notches so that on rotation of one disc the other disc is also caused to rotate through an angle determined by the choice of the number of pegs and the holes in which the pegs are inserted. It will be realised that for each rotation of the disc on the selector shaft the other disc will be moved through an angle determined by the number of pegs which engage, one after another, the notches on the periphery of the other disc. Thus, by selection of the number of pegs to be inserted and the position of the holes in which the pegs are inserted the extent by which the drive to the variable gearing is adjusted for a given angular displacement of the shaft determining the blend, can be altered. As the blend selector and its connection to the drive for the variable area is outside the sealed compartment containing the variator(s), the increment for any blend can be changed without the seal having to be broken.

The invention will now be further described by way of example with reference to the accompanying drawing in which:

FIGURE 1 is a diagrammatic drawing of one embodiment apparatus in accordance with the invention illustrating the liquid and mechanical connections of various parts of the apparatus and FIGURE 2 is an elevation of a part of the apparatus shown in FIGURE 1.

Referring to FIGURES 1 and 2, petrols of relatively high and low octane ratings are pumped by pumps 60, 62 from separate sources of supply (not shown) through flow lines 64, 66. Each flow line passes through meters 68, 70 and through a rotary proportioning device generally indicated at 72.

The proportioning device comprises essentially two variable capacity positive displacement "meters" 74, 76 having a common output shaft 78. The arrangement is such that liquid can only flow through the controller in accordance with the setting of the capacity of the two meters. For example if the capacity of one "meter" is set to be twice that of the other, then a blend of two parts of the liquid passing through the said one meter and one part of the liquid passing through the other meter will be dispensed.

Each meter has a number of outwardly extending vanes 80 the outer ends of which seal with the inner wall of the casing. The capacities of the two meters 74, 76 and hence the relative amounts of each of the two liquids flowing through the pipes 64, 66 can be adjusted in any suitable manner, by rotation of the shaft 78, the capacity of one "meter" increasing as the capacity of the other meter decreases.

The liquids then flow through a pressure balancing device generally indicated at 82 to a concentric hose 83 and common nozzle 85.

The pressure regulating unit 82 which acts to effect an equalization of the pressure acting upon the two vane assemblies 80 of the rotary blend controller, is coupled as indicated at 84, 86 to the flow lines 64, 66 at a point prior to the controller. A common diaphragm assembly 88 is then subjected to these pressures to move flow restriction valves 90, 92, in the regulator in the direction to effect equalisation of the pressures.

The outlet shafts indicated at 94, 96 of the meters 68, 70 which are driven by the passage of liquid therethrough drive the input shafts of a standard adding differential 98 and the output from the differential drives the input shaft of a standard gear variator unit 100. This variator acts in a known manner to multiply the volume as represented by the output from the differential 98, by a common unit price to which the variator is set and hence the output 102 of the variator is indicative of the volume of the blended petrol being dispensed multiplied by a fixed unit price.

The other output drive 104 from the variator is not multiplied by the unit price and hence represents the total volume of blended petrol being dispersed which is indicated on a total volume indicator 106 driven by the drive 104.

The drive 94 representing the total volume of that petrol dispensed through the meter 68 also drives a disc 108 forming part of a variable gear device. A gear wheel 110 engages in one of a number of concentric gear tracks 112 in the face of the disc 108 and on rotation of the disc, by the drive 94, the gear wheel 110 will be rotated to an extent depending upon which of the concentric tracks is engaged. The drive 114 from the gear wheel 110 represents the volume of one petrol multiplied by a second unit price and provides an increment, either positive or negative, which is to be added to the cost indicated by the drive 102.

The drive 96 from the other meter 70 drives a similar disc 116 forming part of the variable gear device and this disc in turn drives a gear 118 resulting in a second output drive 120 representing the volume of the other petrol multiplied by a third unit price which is dependent on the setting of the gear 118 across the face of the disc 116 and which is normally the same as the second unit price, the exception being when the apparatus is used as described hereafter to compute proportionally.

The drives 114 and 120 are added together by a standard adding differential 122 to provide the total increment which is added to or subtracted from the cost indicated by the variator output drive 102, by a standard adding differential 124, the output 126 of which is indicative of the total cost and drives a total cost computer and display unit indicated at 128.

The setting of the vanes 80 of the flow rate controller and hence the relative proportions of the two liquids in the blend is achieved by rotation of the shaft 78 connecting the two sets of vanes, and this is done for example by a worm and wormwheel arrangement generally indicated at 130 driven through a shaft 132 by a blend selector handle 134. On angular rotation of the handle 134 to one or another position determined by a detent device 136, to produce a desired blend the shaft 132 is turned, adjusting the position of the blend controller shaft 78.

A disc 138 is secured to the shaft 132 and is formed around its periphery with a number of holes 140 (see FIGURE 2). A number of pegs 142 are inserted in selected holes 140 to project through the disc 138 and engage the notched periphery of a second disc 144 secured to a drive shaft 146 which controls the setting of the variable gear device. It will be appreciated that for any given angular movement of the disc 138 depending upon the blend selected, the disc 144 will be rotated through an angle dependent upon the number of pegs which pass through the position of overlap of the discs 138 and 144, each peg as it moves past the periphery of the disc 144 engaging the notched periphery thereof to effect an angular displacement of disc 144.

The angular movement of the disc 144 and hence the drive transmitted by the shaft 146 for any driven movement of the shaft 132, can be altered by alteration of the number of pegs and the holes in which they are inserted in the disc 138. Consequently the price of any blend can be altered.

The drive transmitted by the shaft indicated at 146, in change of the blend, is used to indicate the price per gallon on an indicator dial 148 and is arranged to transmit a drive through a sealed coupling 150 to a chain or belt 152 attached at 154 to the wheel 110 and at 156 to the gear wheel 118 so as to move the belt around support wheel 158 and hence alter the position of the wheels 110 and 118 across the discs 108 and 116 respectively and hence to alter that one of the concentric tracks or the discs 108, 116 in which the gears 110, 156 engage.

Conveniently the two discs and gears give a range of ±6 d per unit volume in ½ d steps, set at a common price by the operation of the means to alter the blend selected.

It will be appreciated that the variator 100 has to be located in a sealed compartment indicated in the drawing by dot and dash lines 160 so as to prevent unauthorised alteration of the basic price. Consequently if the adjustment of the price of any one blend had to be carried out at a variator only an official authorised to break and reseal the compartment would be able to effect the change. However, the amount of the increment can be changed with apparatus in accordance with the invention, by an adjustment made outside the sealed compartment, using for example the disc and peg device described above, so that the price of any blend can be changed without having to break into the sealed compartment. Of course if the price of any blend moves outside the range of the variable gearing, then the variator must be adjusted. The coupling 150 is sealed so as to ensure that when the variator 100 is adjusted a corresponding adjustment is made to the price per gallon indicated at 148.

If it is desired for the apparatus to compute a price strictly in proportion to the basic prices of the two petrols being blended this can be achieved by setting the variator to a price less than either of the two petrols and setting each disc of the variable gearing to a different unit price which is equal to the price of each petrol respectively above the price to which the variator is set so as to add an increment which represents a cost calculated on the volume of each petrol.

In this case a price per gallon indicator such as that shown at 148 will be present for each of the two petrols.

We claim:

1. In an apparatus for dispensing a blend of different liquids, a pumping unit for each liquid for conveying each of said liquids through a meter to a common outlet, means for controlling the flow of each liquid in accordance with the amount of each liquid required for a given blend, means for computing the price of said given blend by multiplying a volume of the blended liquids by a price per unit volume, a variable gear means, a single drive representing the total volume of the blend being dispensed for driving said variable gear means, an output means from said variable gear means providing an increment value to the output of said price computing means prior to the display of the total price, and means for adjusting said variable gear means to vary said incremental value output for a given selected blend.

2. Apparatus as claimed in claim 1 in which the amount of said incremental output is determined by a drive transmitted from a control means for determining the relevant proportions of the liquids in the blend.

3. Apparatus as claimed in claim 2 in which a gear control means is connected to said means for selecting the proportions of the constituents of the blend, said means for adjusting said variable gear means independently of the blend selection being incorporated in a connection between said variable gear means and said blend selection means.

4. Apparatus as claimed in claim 3 wherein said means to adjust the variable gear independently of the blend selection comprises a disc on a shaft which is turned through an angle when the selected blend is to be changed and a second disc forming part of the drive to the variable gear, said disc of the blend selector shaft driving the second disc by a peg means in means defining selected holes in the periphery of one of said discs and in the path of the periphery of the other of said discs which is formed with notches whereby on rotation of one disc the other disc is caused to rotate through an angle determined by said peg means and said holes in which said peg means are inserted.

5. Apparatus as claimed in claim 1 wherein the output of each of said meters is added together to produce a drive indicative of the total volume of the liquids, which drive is transmitted to a single price computing units which acts to multiply the total volume by a unit price.

6. Apparatus as claimed in claim 1 wherein said means to control the quantities of each of the liquids dispensed in accordance with the desired blend comprises a blend valve located in each of the flow lines the positions of the valves being controlled by the output shaft of a subtracting differential gearing the input shafts of which are driven from the blend selection control and by a drive indicative of the total volume of liquid being dispensed.

7. In an apparatus for dispensing a blend of different liquids, a pumping unit for each liquid for conveying each of said liquids through a meter to a common outlet, means for controlling the flow of each liquid in accordance with the amount of each liquid required for a given blend, means for computing the price of said given blend by multiplying a volume of the blended liquids by a price per unit volume, a variable gear means, a plurality of separate drive means each representative of the total volume of one of the liquids respectively for driving said variable gear means, an output means from said variable gear means providing an incremental value to the output of said price computing means prior to the display of the total price, and means for adjusting said variable gear means to vary said incremental value output for a given selected blend.

References Cited
UNITED STATES PATENTS

| | | | |
|---|---|---|---|
| 2,858,049 | 10/1958 | Young et al. | 222—26 |
| 3,081,000 | 3/1963 | Chiantelassa | 222—26 |
| 3,022,919 | 2/1962 | Chiantelassa | 222—26 |

ROBERT B. REEVES, *Primary Examiner.*

H. S. LANE, *Assistant Examiner.*

U.S. Cl. X.R.

222—134